United States Patent
Kojima et al.

(10) Patent No.: US 9,440,221 B2
(45) Date of Patent: Sep. 13, 2016

(54) TITANIUM OXIDE DISPERSION LIQUID, TITANIUM OXIDE COATING LIQUID, AND PHOTOCATALYST COATING FILM

(71) Applicant: DAICEL CORPORATION, Osaka-shi, Osaka (JP)

(72) Inventors: Ryouta Kojima, Himeji (JP); Naoyuki Fukui, Himeji (JP); Hitoshi Watanabe, Himeji (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 14/769,211

(22) PCT Filed: Mar. 6, 2014

(86) PCT No.: PCT/JP2014/055741
§ 371 (c)(1),
(2) Date: Aug. 20, 2015

(87) PCT Pub. No.: WO2014/141992
PCT Pub. Date: Sep. 18, 2014

(65) Prior Publication Data
US 2016/0001266 A1      Jan. 7, 2016

(30) Foreign Application Priority Data

Mar. 15, 2013   (JP) ................. 2013-053082

(51) Int. Cl.
| | | |
|---|---|---|
| B01J 21/00 | (2006.01) | |
| B01J 21/06 | (2006.01) | |
| B01J 23/745 | (2006.01) | |
| C09D 5/16 | (2006.01) | |
| C09D 7/12 | (2006.01) | |
| C09D 201/00 | (2006.01) | |
| C08F 220/06 | (2006.01) | |
| B01D 53/86 | (2006.01) | |
| B01J 37/02 | (2006.01) | |
| B01J 35/00 | (2006.01) | |
| B01J 31/06 | (2006.01) | |
| B01J 31/26 | (2006.01) | |
| B01J 35/10 | (2006.01) | |

(52) U.S. Cl.
CPC .......... *B01J 21/063* (2013.01); *B01D 53/8668* (2013.01); *B01J 23/745* (2013.01); *B01J 31/06* (2013.01); *B01J 31/26* (2013.01); *B01J 35/004* (2013.01); *B01J 37/0203* (2013.01); *B01J 37/0219* (2013.01); *C08F 220/06* (2013.01); *C09D 5/16* (2013.01); *C09D 5/1606* (2013.01); *C09D 7/12* (2013.01); *C09D 7/1208* (2013.01); *C09D 201/00* (2013.01); *B01D 2255/20707* (2013.01); *B01D 2255/20738* (2013.01); *B01D 2255/802* (2013.01); *B01D 2257/306* (2013.01); *B01D 2257/708* (2013.01); *B01D 2257/90* (2013.01); *B01D 2257/91* (2013.01); *B01D 2258/06* (2013.01); *B01D 2259/4508* (2013.01); *B01D 2259/4591* (2013.01); *B01D 2259/804* (2013.01); *B01J 35/1014* (2013.01)

(58) Field of Classification Search
None
See application file for complete search history.

(56) References Cited

U.S. PATENT DOCUMENTS

| | | | | |
|---|---|---|---|---|
| 5,068,056 A | * | 11/1991 | Robb | ........................ A61K 8/29 106/436 |
| 7,820,584 B2 | * | 10/2010 | Ishibai | ..................... B01J 23/42 502/227 |
| 8,758,574 B2 | * | 6/2014 | Ohno | .................... B01J 21/063 204/157.6 |
| 2006/0264520 A1 | | 11/2006 | Sonezaki et al. | |
| 2007/0292686 A1 | | 12/2007 | Nagasawa et al. | |
| 2009/0124490 A1 | * | 5/2009 | Miyazoe | .................. B01J 21/08 502/242 |

FOREIGN PATENT DOCUMENTS

| | | |
|---|---|---|
| EP | 1 630 136 A1 | 3/2006 |
| JP | 11-188270 A | 7/1999 |
| JP | 2004-143453 A | 5/2004 |
| JP | 2005-194176 A | 7/2005 |
| JP | 2005-314409 A | 11/2005 |
| JP | 3755852 B2 | 3/2006 |
| JP | 2007-252987 A | 10/2007 |
| JP | 2009-56348 A | 3/2009 |
| JP | 2009-114030 A | 5/2009 |
| JP | 2009-227515 A | 10/2009 |
| JP | 2010-222444 A | 10/2010 |

(Continued)

OTHER PUBLICATIONS

English translation of JP2011032146.*

(Continued)

*Primary Examiner* — Melvin C Mayes
*Assistant Examiner* — Stefanie Cohen
(74) *Attorney, Agent, or Firm* — Birch, Stewart, Kolasch & Birch, LLP

(57) ABSTRACT

Provided is a titanium oxide dispersion liquid that has dispersibility and dispersion stability both at superior levels and, when applied and dried, can form a photocatalyst coating film capable of rapidly developing excellent photocatalytic activity. The titanium oxide dispersion liquid according to the present invention includes titanium oxide particles (A), a dispersing agent (B), and a solvent (C). The titanium oxide particles (A) support a transition metal compound. The dispersing agent (B) includes a poly(acrylic acid) or a salt thereof. The poly(acrylic acid) or a salt thereof in the dispersing agent (B) preferably includes a poly(acrylic acid) alkali metal salt. The poly(acrylic acid) or a salt thereof in the dispersing agent (B) preferably has a weight-average molecular weight of from 1000 to 100000.

8 Claims, No Drawings

(56) References Cited

FOREIGN PATENT DOCUMENTS

| JP | 2011032146 A | * | 2/2011 |
| WO | WO 2004/087577 A1 | | 10/2004 |
| WO | WO 2007/125998 A1 | | 11/2007 |

OTHER PUBLICATIONS

International Search Report, issued in PCT/JP2014/055741, dated Jun. 10, 2014.

* cited by examiner

TITANIUM OXIDE DISPERSION LIQUID, TITANIUM OXIDE COATING LIQUID, AND PHOTOCATALYST COATING FILM

TECHNICAL FIELD

The present invention relates to a titanium oxide dispersion liquid for the formation of a coating film having a photocatalytic activity, a titanium oxide coating liquid containing the titanium oxide dispersion liquid, a photocatalyst coating film formed using the titanium oxide coating liquid, and a photocatalyst-coated article. The present application claims priority to Japanese Patent Application No. 2013-053082 filed to Japan on Mar. 15, 2013, the entire contents of which are incorporated herein by reference.

BACKGROUND ART

Titanium oxide particles exhibit intense oxidation upon absorption of an ultraviolet ray and are recently used as photocatalysts in a variety of applications such as applications (1) to (5):

(1) air purification by removing environmental pollutants, such as nitrogen oxides (NOx) and sulfur oxides (SOx) which are emitted typically in automobile exhaust gases;

(2) deodorization by removing malodor-causative substances such as ammonia, acetaldehyde, hydrogen sulfide, and methyl mercaptan;

(3) water purification by decomposing and removing organochlorine compounds such as tetrachloroethylene and trihalomethanes;

(4) antimicrobial applications by killing microorganisms and further decomposing the dead microorganisms; and (5) antifouling applications by decomposing oils to prevent soiling caused by the attachment of sand and dirt to the oils.

Titanium oxide photocatalysts are roughly classified into one used as being suspended in solutions; and one used as supported on substrates (carriers). In general, the former has higher activities as compared with the latter, because such catalysts generally have a photocatalytic activity proportional to the size of surface area. However, the latter is more often employed as compared with the former from the viewpoint of practicality. In the case of the latter, the titanium oxide photocatalyst may be used mainly by highly dispersing the titanium oxide photocatalyst using a dispersing agent, and bringing the highly dispersed titanium oxide photocatalyst into intimate contact with a substrate using a binder component.

Known examples of the dispersing agent to be used include polymeric organic compounds such as polycarboxylates, salts of naphthalenesulfonic acid/formalin condensates, and polyethylene glycols; and inorganic compounds such as hexametaphosphates, pyrophosphates, phosphates, and oxalates (Patent Literature (PTL) 1 to 3). The dispersing agent, when used, effectively allows the titanium oxide photocatalyst to be highly dispersed, to have a larger specific surface area, and to have a higher photocatalytic activity. However, the dispersing agent, when present on or over a surface of the titanium oxide photocatalyst, preferentially receives oxidation in a portion overlying the surface of the titanium oxide photocatalyst, and this reduces the apparent photocatalytic effect of the photocatalyst. In particular, assume that the titanium oxide photocatalyst employs an inorganic compound as the dispersing agent. Disadvantageously, the titanium oxide photocatalyst in this case fails to develop the inherent photocatalyst effect, because such inorganic compound resists decomposition by the photocatalysis of the titanium oxide photocatalyst. In addition, the titanium oxide photocatalyst employing the inorganic compound as the dispersing agent has excellent initial dispersibility, but hardly maintains a high dispersion state over a long time, and has poor dispersion stability.

In contrast, when the titanium oxide photocatalyst employs a polymeric organic compound as the dispersing agent, the dispersing agent present in the surface of the titanium oxide photocatalyst is preferentially decomposed. Assume that the polymeric organic compound is used in such a sufficient amount as to highly disperse the titanium oxide photocatalyst. Disadvantageously, it takes a long waiting time for the titanium oxide photocatalyst in this case to develop the inherent photocatalyst effect. Assume that the titanium oxide photocatalyst employs a polymeric organic compound having a low molecular weight. Unfortunately, the polymeric organic compound hardly gives effects as the dispersing agent, although it can contribute to a shorter waiting time for the titanium oxide photocatalyst to develop the photocatalytic activity.

PTL 4 describes a binder component employing titanium peroxide in combination with a polysaccharide such as chitosan or cellulose. Disadvantageously, however, the polysaccharide such as chitosan or cellulose is insoluble in water and should be dissolved in a large amount of an aqueous hydrogen peroxide solution at a high temperature so as to prepare a binder liquid. In addition, the resulting coating liquid becomes acidic and is limited in applications.

CITATION LIST

Patent Literature

PTL 1: Japanese Unexamined Patent Application Publication (JP-A) No. 2007-252987
PTL 2: JP-A No. 2009-056348
PTL 3: JP-A No. 2010-222444
PTL 4: Japanese Patent No. 3755852

SUMMARY OF INVENTION

Technical Problem

Accordingly, the present invention has an object to provide a titanium oxide dispersion liquid that has dispersibility and dispersion stability both at superior levels and, when applied and dried, can form a photocatalyst coating film rapidly developing an excellent photocatalytic activity.

The present invention has another object to provide a titanium oxide coating liquid that can be prepared by a simple operation without need for being dissolved in a large amount of an aqueous hydrogen peroxide solution at a high temperature, contributes to cost reduction, and has excellent dispersibility, dispersion stability, and coatability.

The present invention has yet another object to provide a titanium oxide coating liquid that can be prepared in a nearly neutral region and has excellent dispersibility, dispersion stability, and coatability.

The present invention has still another object to provide a photocatalyst coating film formed using the titanium oxide coating liquid; and a photocatalyst-coated article including a substrate and, disposed on or over a surface thereof, the photocatalyst coating film.

Solution to Problem

After intensive investigations to achieve the objects, the present inventors have found that titanium oxide particles supporting a transition metal compound, when blended with a solvent and a specific dispersing agent, can give a titanium oxide dispersion liquid as follows. Specifically, the titanium oxide dispersion liquid can be prepared simply at a temperature around room temperature in a nearly neutral region without being dissolved in a large amount of an aqueous hydrogen peroxide solution at a high temperature. The titanium oxide dispersion liquid has dispersibility and dispersion stability both at superior levels and, when applied and dried, can form a photocatalyst coating film that rapidly develops an excellent photocatalytic activity. The present invention has been made based on these findings.

Specifically, the present invention provides, in one aspect, a titanium oxide dispersion liquid including titanium oxide particles (A), a dispersing agent (B), and a solvent (C). The titanium oxide particles (A) support or bear a transition metal compound. The dispersing agent (B) includes a poly(acrylic acid) or a salt thereof.

In the titanium oxide dispersion liquid, the dispersing agent (B) may include a poly(acrylic acid) alkali metal salt as the poly(acrylic acid) or a salt thereof.

The poly(acrylic acid) or a salt thereof in the dispersing agent (B) in the titanium oxide dispersion liquid may have a weight-average molecular weight of from 1000 to 100000.

The titanium oxide particles (A) supporting a transition metal compound in the titanium oxide dispersion liquid may include titanium oxide particles supporting an iron compound.

The titanium oxide particles (A) supporting a transition metal compound in the titanium oxide dispersion liquid may include titanium oxide particles supporting the transition metal compound on a plane acting as an oxidation site.

The titanium oxide particles (A) supporting a transition metal compound in the titanium oxide dispersion liquid may include rutile titanium dioxide particles as the titanium oxide particles.

The present invention further provides, in another aspect, a titanium oxide coating liquid including the titanium oxide dispersion liquid, and at least one binder component (D) selected from the group consisting of titanium peroxide, silicon compounds, and fluorocarbon resins.

The binder component (D) in the titanium oxide coating liquid may contain titanium peroxide.

The present invention provides, in yet another aspect, a photocatalyst coating film formed using the titanium oxide coating liquid.

The present invention provides, in another aspect, a photocatalyst-coated article including a substrate and the photocatalyst coating film disposed on or over a surface of the substrate.

Specifically, the present invention relates to followings.

(1) A titanium oxide dispersion liquid including titanium oxide particles (A), a dispersing agent (B), and a solvent (C), where the titanium oxide particles (A) support a transition metal compound, and the dispersing agent (B) includes a poly(acrylic acid) or a salt thereof.

(2) In the titanium oxide dispersion liquid according to (1), the dispersing agent (B) may include a poly(acrylic acid) alkali metal salt as the poly(acrylic acid) or a salt thereof.

(3) In the titanium oxide dispersion liquid according to one of (1) and (2), the poly(acrylic acid) or a salt thereof in the dispersing agent (B) may have a weight-average molecular weight of from 1000 to 100000.

(4) In the titanium oxide dispersion liquid according to any one of (1) to (3), the titanium oxide particles (A) supporting a transition metal compound may include titanium oxide particles supporting an iron compound.

(5) In the titanium oxide dispersion liquid according to any one of (1) to (4), the titanium oxide particles (A) supporting a transition metal compound may include titanium oxide particles supporting the transition metal compound on a plane acting as an oxidation site.

(6) In the titanium oxide dispersion liquid according to any one of (1) to (5), the titanium oxide particles in the titanium oxide particles (A) supporting a transition metal compound may include rutile titanium dioxide particles.

(7) In the titanium oxide dispersion liquid according to any one of (1) to (6), titanium oxide particles (A) supporting a transition metal compound may include rutile titanium dioxide having (110) and (111) planes and supporting an iron compound on the (111) plane; and/or rutile titanium dioxide particles having (110), (111), and (001) planes and supporting an iron compound on the (001) and (111) planes.

(8) A titanium oxide coating liquid including the titanium oxide dispersion liquid according to any one of (1) to (7), and at least one binder component (D) selected from the group consisting of titanium peroxide, silicon compounds, and fluorocarbon resins.

(9) In the titanium oxide coating liquid according to (8), the binder component (D) may contain titanium peroxide.

(10) A photocatalyst coating film formed using the titanium oxide coating liquid according to one of (8) and (9).

(11) A photocatalyst-coated article including a substrate, and the photocatalyst coating film according to (10) disposed on or over a surface of the substrate.

Advantageous Effects of Invention

The titanium oxide dispersion liquid according to the present invention employs a poly(acrylic acid) or a salt thereof as a dispersing agent. The titanium oxide dispersion liquid can thereby be prepared simply at a temperature adjacent to room temperature in a nearly neutral region without being dissolved in a large amount of an aqueous hydrogen peroxide solution at a high temperature, has excellent dispersion stability, and can maintain a high dispersion state over a long time. In addition, the titanium oxide dispersion liquid can shorten the waiting time for the titanium oxide photocatalyst to decompose the dispersing agent and to develop the inherent photocatalytic performance and can ensure the immediate effectivity of the photocatalytic performance of the titanium oxide photocatalyst. The titanium oxide coating liquid according to the present invention contains the titanium oxide dispersion liquid, can thereby be prepared in a nearly neutral region, and is highly versatile. In addition, the titanium oxide coating liquid according to the present invention has high dispersibility and superior dispersion stability and offers excellent coatability.

DESCRIPTION OF EMBODIMENTS

Titanium Oxide Particles (A) Supporting Transition Metal Compound

The present invention employs, as a photocatalyst, the titanium oxide particles (A) supporting a transition metal compound. A photocatalyst coating film formed using the titanium oxide coating liquid according to the present invention thereby has responsibility to light in a wide wavelength range from the ultraviolet ray region to the visible light region and exhibits a high catalytic activity even under a light source in a regular light space, such as sunlight, an incandescent lamp, or a fluorescent lamp.

The "titanium oxide particles" in the titanium oxide particles (A) supporting a transition metal compound are exemplified by rutile, anatase, and brookite titanium oxide particles. Among them, rutile titanium dioxide particles are preferred in the present invention because of having a shape with a large aspect ratio.

The transition metal compound may be supported on the titanium oxide particles in any form such as a transition metal ion, a transition metal as a simple substance, a transition metal salt, a transition metal oxide, a transition metal hydroxide, or a transition metal complex.

The transition metal compound is preferably selected from those having an absorption spectrum in the visible light region and being capable of injecting an electron into a conduction band in an excited state, such as compounds of elements belonging to Groups 3 to 11 in the periodic table. Among them, compounds of elements belonging to Groups 8 to 11 in the periodic table are preferred, of which iron compounds are more preferred, and trivalent iron compounds are particularly preferred. This is because, of such iron compounds upon supporting on the titanium oxide particles, trivalent iron compounds are readily adsorbed, but divalent iron compounds resist adsorption, and using these properties, an iron compound as the transition metal compound can be easily supported plane-selectively.

As used herein the term "supporting a transition metal compound plane-selectively" refers to that greater than 50% (preferably 70% or more, and particularly preferably 80% or more) of the transition metal compound to be supported on the titanium oxide particles having two or more exposed crystal planes is supported on not all the planes, but on a specific plane (e.g., specific one plane or two planes) among the exposed crystal planes. The supporting of the transition metal compound can be determined by detecting a signal derived from the transition metal compound on the exposed crystal plane(s) using a transmission electron microscope (TEM) and/or an energy dispersive X-ray fluorescence spectrometer (EDX).

The transition metal compound may be supported in an amount of typically 50 ppm or more, preferably 100 ppm or more, more preferably 200 ppm or more, particularly preferably 300 ppm or more, and most preferably 500 ppm or more on weight basis relative to the titanium oxide particles. The upper limit of the amount of the transition metal compound is typically about 5000 ppm, preferably 3000 ppm, and particularly preferably 2000 ppm. The transition metal compound, if supported in an amount greater than the range, may fail to allow the excited electron to act effectively and may cause the photocatalyst to have a lower photocatalytic activity. In contrast, the transition metal compound, if supported in an excessively small amount, may cause the photocatalyst to readily have lower responsibility to visible light.

The transition metal compound is preferably supported selectively on, out of the exposed crystal planes of the titanium oxide particles, one of a plane acting as an oxidation site and a plane acting as a reduction site (in particular, on the plane acting as an oxidation site). This is preferred because this can separate an oxidation site from a reduction site spatially largely, contributes to better separation between an excited electron and a hole, can restrain the progress of recombination and reverse reaction of the excited electron and the hole to extremely low level, and allows the photocatalyst to exhibit a still higher photocatalytic activity.

Of such titanium oxide particles, rutile titanium dioxide particles have exposed crystal planes mainly typified by (110), (001), (111), and (011) planes. The rutile titanium dioxide particles are exemplified by rutile titanium dioxide particles having (110) and (111) planes; rutile titanium dioxide particles having (110) and (011) planes; and rutile titanium dioxide particles having (001), (110), and (111) planes. Among them, preferred in the present invention are the rutile titanium dioxide particles having (110) and (111) planes; and the rutile titanium dioxide particles having (001), (110), and (111) planes. They are preferred because they can separate an oxidation site from a reduction site spatially largely and can restrain the progress of recombination and reverse reaction of the excited electron and the hole. The (111) plane and the (001) plane are planes each acting as an oxidation site, whereas the (110) plane is a plane acting as a reduction site.

Accordingly, the titanium oxide particles supporting a transition metal compound for use in the present invention are particularly preferably rutile titanium dioxide having (110) and (111) planes and supporting an iron compound on the (111) plane and/or rutile titanium dioxide particles having (110), (111), and (001) planes and supporting an iron compound on the (001) and (111) planes.

The titanium oxide particles for use herein can be those produced by a known method.

Of the titanium oxide particles, the rutile titanium dioxide particles having (110) and (111) planes and/or the rutile titanium dioxide particles having (001), (110), and (111) planes can be synthetically prepared typically by subjecting a titanium compound to a hydrothermal treatment in an aqueous medium. The aqueous medium is exemplified by water, or a mixture of water and a water-soluble organic solvent. The hydrothermal treatment may be performed typically at 100° C. to 200° C. for 3 to 48 hours (and preferably 6 to 12 hours).

The titanium compound is exemplified by trivalent titanium compounds and tetravalent titanium compounds. The trivalent titanium compounds are exemplified by titanium trihalides such as titanium trichloride and titanium tribromide. Of the trivalent titanium compounds, titanium trichloride ($TiCl_3$) is preferred because it is easily and inexpensively available.

The tetravalent titanium compounds are exemplified by compounds represented by Formula (1):

$$Ti(OR)_tX_{4-t} \quad (1)$$

where R represents, independently in each occurrence, a hydrocarbon group; X represents, independently in each occurrence, a halogen atom; and t represents an integer of 0 to 3.

The hydrocarbon group as R is exemplified by $C_1$-$C_4$ aliphatic hydrocarbon groups such as methyl, ethyl, propyl, isopropyl, n-butyl, sec-butyl, and tert-butyl.

The halogen atom as X is exemplified by chlorine, bromine, and iodine atoms.

The tetravalent titanium compounds as above are exemplified by titanium tetrahalides such as $TiCl_4$, $TiBr_4$, and $TiI_4$; alkoxytitanium trihalides such as $Ti(OCH_3)Cl_3$, $Ti(OC_2H_5)Cl_3$, $Ti(OC_4H_9)Cl_3$, $Ti(OC_2H_5)Br_3$, and $Ti(OC_4H_9)Br_3$; dialkoxytitanium dihalides such as $Ti(OCH_3)_2Cl_2$, $Ti(OC_2H_5)_2Cl_2$, $Ti(OC_4H_9)_2Cl_2$, and $Ti(OC_2H_5)_2Br_2$; and trialkoxytitanium monohalides such as $Ti(OCH_3)_3Cl$, $Ti(OC_2H_5)_3Cl$, $Ti(OC_4H_9)_3Cl$, and $Ti(OC_2H_5)_3Br$. Of the tetravalent titanium compounds for use in the present invention, preferred are titanium tetrahalides because of inexpensive and easy availability, of which titanium tetrachloride ($TiCl_4$) is particularly preferred.

Assume that a tetravalent titanium compound is used as the titanium compound. In this case, the tetravalent titanium compound may be subjected to a hydrothermal treatment at a reaction temperature of 110° C. to 220° C. (preferably 130° C. to 220° C.) under a pressure equal to or higher than a saturated vapor pressure at that reaction temperature in the aqueous medium for 2 hours or longer (preferably 5 to 15 hours). This enables the synthetic preparation of the rutile titanium dioxide particles having (110) and (111) planes and/or the rutile titanium dioxide particles having (001), (110), and (111) planes.

The rutile titanium dioxide having (001), (110), and (111) planes can also be synthetically prepared by placing rutile titanium dioxide particles having (110) and (111) planes in sulfuric acid and stirring them with heating so as to erode (dissolve) a ridge or vertex portion of the titanium dioxide particles. The sulfuric acid is preferably sulfuric acid having a high concentration of 50 percent by weight or more, and particularly preferably concentrated sulfuric acid.

The resulting titanium oxide particles obtained in the above manner can be separated/purified typically by a separation procedure such as filtration, concentration, distillation, extraction, crystallization, recrystallization, or column chromatography, or a separation procedure as any combination of them.

The titanium oxide particles may have a specific surface area of typically 10 $m^2/g$ or more, preferably 10 to 200 $m^2/g$, more preferably 10 to 150 $m^2/g$, furthermore preferably 30 to 150 $m^2/g$, particularly preferably 50 to 100 $m^2/g$, and most preferably 60 to 100 $m^2/g$. The titanium oxide particles, if having a specific surface area less than the range, may tend to exhibit lower capability of adsorbing the reactant (reactive substance) and to have a lower photocatalytic activity. In contrast, the titanium oxide particles, if having a specific surface area greater than the range, may tend to have lower separating ability between the excited electron and the hole and to have a lower photocatalytic activity.

The titanium oxide particles may have any shape not critical, but preferably have a rod-like shape or a needle-like shape. The titanium oxide particles may have an average aspect ratio of typically 1.5 or more, preferably 1.5 to 100, more preferably 1.5 to 50, particularly preferably 1.5 to 20, and most preferably 2 to 15, where the "aspect ratio" refers to the ratio of the major axis to the minor axis of a particle. The titanium oxide particles, if having an average aspect ratio less than the range (namely, if having a shape more approximal to a sphere), may be packed more densely upon mixing with the binder component, may thereby cause the photocatalyst coating film to hardly include pores formed therein and to have a smaller surface area. This may cause the photocatalyst to be exposed from the coating film surface in a smaller amount and to readily have a lower photocatalytic activity.

The average aspect ratio in the present invention is a value as measured by a measurement method on a sample prepared by a preparation method as follows.

Sample Preparation Method

1. A small amount (about earpick-size spatula half-full) of titanium oxide particles is placed in a 9-mL glass sample vial, combined with 7 mL of ethanol, applied with ultrasonic sound by an ultrasonic cleaner for 5 minutes to be dispersed in the ethanol, and yields an ethanol dispersion.

2. One drop of the resulting ethanol dispersion is sampled by a glass dropping pipette, dropped onto a SEM sample stage, air-dried, and subjected to platinum vapor deposition for 30 seconds.

Measurement Method

Crystal grains are observed at random using a field emission scanning electron microscope (trade name FE-SEM JSM-6700F, supplied by JEOL Ltd.) at an acceleration voltage of 15 kV, a WD of about 3 mm, and a magnification of 200000 folds. Representative three points are sampled, and, of the entire sampled SEM photomicrographs, thirty grains having distinct outlines and mainly including grains having average sizes being neither extremely large nor extremely small in appearance are sampled and copied onto a transparency sheet. The grains are examined to determine their minor axes (width perpendicular to a largest dimension (largest axis or length) using an image analyzing software (trade name WinROOF Version 5.6, supplied by Mitani Corporation). The determined minor axes are averaged, and the average is defined as an average minor axis. An average major axis (average largest dimension) is determined in the same manner. The ratio of the average major axis to the average minor axis is defined as the average aspect ratio.

The transition metal compound may be supported on the titanium oxide particles typically by an impregnation technique in which the titanium oxide particles are impregnated with the transition metal compound.

Specifically, the impregnation can be performed by adding the transition metal compound to an aqueous dispersion (water dispersion) of the titanium oxide particles. Typically, assume that a trivalent iron compound is used as the transition metal compound. In this case, the impregnation can be performed by adding an iron compound such as iron(III) nitrate, iron(III) sulfate, or iron(III) chloride to the aqueous dispersion.

The impregnation may be performed for an impregnation time of typically about 30 minutes to about 24 hours, and preferably 1 to 10 hours.

The impregnation of the titanium oxide particles with the transition metal compound is preferably performed with application of exciting light. The exciting light, when applied, excites an electron in a valence band of the titanium oxide particles to a conduction band to form a hole in the balance band and an excited electron in the conduction band. The excited electron and the hole diffuse to the particle surface, are separated from each other according to the characteristic properties of the exposed crystal planes, and thereby respectively form a plane acting as an oxidation site and a plane acting as a reduction site. Assume that the titanium oxide particles in this state are impregnated with a trivalent iron compound as an example of the transition metal compound. In this case, the trivalent iron compound is adsorbed by the plane acting as an oxidation site, but is reduced into a divalent iron compound on the plane acting as a reduction site. The resulting divalent iron compound has such a property as to resist adsorption and is dissolved into the solution. This gives titanium oxide particles supporting, as the transition metal compound, an iron compound selectively on the plane acting as an oxidation site.

The exciting light application has only to be performed by applying light having energy equal to or higher than the band-gap energy and may be performed typically by applying an ultraviolet ray. An ultraviolet application device usable herein is exemplified by ultraviolet ray exposure systems using a light source that efficiently emits an ultraviolet ray, where the light source is exemplified by medium/high-pressure mercury lamps, UV laser systems, UV-LEDs, and black light lamps. The exciting light may be applied at an irradiance (radiant exposure) of typically about 0.1 to about 300 $mW/cm^2$, and preferably 1 to 5 $mW/cm^2$.

The impregnation in the present invention may be performed with the addition of a sacrificial agent. The sacrificial agent, when added, allows the titanium oxide particles to support the transition metal compound highly selectively on a specific exposed crystal plane(s) in the surface. The sacrificial agent for use herein is preferably an organic compound that is liable to release an electron by itself. Such organic compound is exemplified by alcohols such as methanol and ethanol; carboxylic acid such as acetic acid; and amines such as ethylenediaminetetraacetic acid (EDTA) and triethanolamine (TEA).

The sacrificial agent may be added in an amount of typically about 0.5 to about 5.0 percent by weight, and preferably 1.0 to 2.0 percent by weight relative to the amount of the titanium oxide solution, while the amount can be adjusted as appropriate. The sacrificial agent may be used in an excessive amount.

The titanium oxide particles supporting a transition metal compound obtained in the above manner can be separated/purified by a separation procedure such as filtration, concentration, distillation, extraction, crystallization, recrystallization, or column chromatography, or a separation procedure as any combination of them.

Dispersing Agent (B)

The present invention employs a poly(acrylic acid) or a salt thereof as a dispersing agent. The poly(acrylic acid) and poly(acrylic acid) salt are soluble in water and contribute to easy preparation of the titanium oxide dispersion liquid and the titanium oxide coating liquid by a simple operation. An aqueous solution of the poly(acrylic acid) or a salt thereof (of which the poly(acrylic acid) salt is preferred) is nearly neutral. The titanium oxide dispersion liquid and the titanium oxide coating liquid each including the aqueous solution are thereby not limited in uses/applications and are highly versatile. In addition, the poly(acrylic acid) or a salt thereof has a low molecular weight per carboxy group or a salt thereof (—COOM, where M is selected typically from a hydrogen atom, a metal atom, and an ammonium ion) and can be used in a smaller amount so as to disperse the titanium oxide particles. This can reduce the amount (concentration) of organic groups in the photocatalyst coating film formed from the titanium oxide coating liquid and thereby shorten the waiting time for the photocatalyst to decompose the dispersing agent and to develop the inherent photocatalytic performance. Namely, this can ensure the immediate effectivity of the photocatalytic performance. In addition, the configuration can reduce the amount of VOCs (i.e., volatile organic compounds), such as acetaldehyde, formed by the decomposition of the dispersing agent and can restrain odor generation. In addition and advantageously, the titanium oxide coating liquid using the poly(acrylic acid) or a salt thereof as the dispersing agent gives a photocatalyst coating film that has high hardness and is resistant to scratches.

The poly(acrylic acid) or a salt thereof for use herein may be selected from known poly(acrylic acid)s and poly(acrylic acid) salts and are exemplified by poly(acrylic acid)s; poly(acrylic acid) alkali metal salts such as lithium polyacrylate, sodium polyacrylate, potassium polyacrylate, and cesium polyacrylate; and ammonium polyacrylate. Among them, preferred are sodium polyacrylate, potassium polyacrylate, and ammonium polyacrylate, of which sodium polyacrylate and potassium polyacrylate are particularly preferred, for restraining coloring. The poly(acrylic acid) or a salt thereof usable herein may also be selected from commercial products available typically under the trade names of Aron T-50, Aron A-210, and Aron A-30L (each from Toagosei Co., Ltd.), the trade name of AQUALIC DL (from Nippon Shokubai Co., Ltd.), and the trade name of NOPCOSPERSE 44C (from SAN NOPCO LIMITED).

The poly(acrylic acid) or a salt thereof may have a weight-average molecular weight that is not critical, but can be selected as appropriate within the range of typically 1000 to 100000, preferably 1200 to 50000, more preferably 1500 to 30000, and particularly preferably 6000 to 20000. The poly(acrylic acid) or a salt thereof having a weight-average molecular weight within the range, even when used in a small amount, can stably disperse the titanium oxide particles supporting a transition metal compound. The poly(acrylic acid) or a salt thereof, if having a weight-average molecular weight less than the range, may tend to fail to offer dispersion stability when added in a small amount. In contrast, the poly(acrylic acid) or a salt thereof, if having a weight-average molecular weight greater than the range, may contrarily accelerate the aggregation of the titanium oxide supporting a transition metal compound.

Solvent (C)

The solvent (C) usable herein is exemplified by water, organic solvents, and mixtures of these solvents. The organic solvents are exemplified by alcohols such as methanol, ethanol, propanol, isopropyl alcohol, butanol, isobutyl alcohol, diacetone alcohol, furfuryl alcohol, ethylene glycol, propylene glycol, 1,3-propanediol, 1,4-butanediol, 1,6-hexanediol, and glycerol; esters such as methyl acetate, ethyl acetate, propyl acetate, isopropyl acetate, butyl acetate, ethylene glycol methyl ether acetate, and propylene glycol methyl ether acetate; chain or cyclic ethers such as diethyl ether, diisopropyl ether, dibutyl ether, ethylene glycol monomethyl ether, ethylene glycol monoethyl ether, ethylene glycol monobutyl ether, diethylene glycol monoethyl ether, propylene glycol monomethyl ether, tetrahydrofuran, and dioxane; and ketones such as acetone, methyl ethyl ketone, acetylacetone, and acetoethyl acetate. Each of different organic solvents may be used alone or in combination.

Binder Component (D)

The binder component (D) for use in the present invention has the function of affixing the titanium oxide particles to the substrate (article to be coated) and can be at least one selected from titanium peroxide (i.e., peroxotitanic acid), silicon compounds, and fluorocarbon resins.

The titanium peroxide is considered to be a binuclear complex represented by the formula:

$$Ti_2O_5(OH)_x^{(2-x)}$$

where x represents an integer of 1 to 6.

The titanium peroxide can be synthetically prepared typically by adding an aqueous hydrogen peroxide solution to an aqueous solution of a titanium compound such as $TiCl_4$ in the presence of a basic substance. The basic substance is exemplified by ammonia water and sodium hydroxide.

The silicon compounds are exemplified by halogenated silane compounds such as tetrabromosilane, tetrachlorosilane, tribromosilane, trichlorosilane, dibromosilane, dichlorosilane, monobromosilane, monochlorosilane, dichlorodimethylsilane, dichlorodiethylsilane, dichloromethylsilane, dichloroethylsilane, chlorotrimethylsilane, chlorotriethylsilane, chlorodimethylsilane, chlorodiethylsilane, chloromethylsilane, chloroethylsilane, t-butylchlorodimethylsilane, and t-butylchlorodiethylsilane; and alkoxysilane compounds such as tetramethoxysilane, tetraethoxysilane, trimethoxysilane, triethoxysilane, dimethoxysilane, diethoxysilane, methoxysilane, ethoxysilane, dimethoxymethylsilane, diethoxymethylsilane, dimethoxyethylsilane, diethoxyethylsilane, methoxydimethylsilane, ethoxydimethylsilane, methoxydiethylsilane, and ethoxydiethylsilane.

The fluorocarbon resins are exemplified by polytetrafluoroethylenes, poly(vinylidene fluoride)s, poly(vinyl fluoride)

s, polychlorotrifluoroethylenes, tetrafluoroethylene-hexafluoropropylene copolymers, ethylene-tetrafluoroethylene copolymers, ethylene-chlorotrifluoroethylene copolymers, tetrafluoroethylene-perfluoroalkyl vinyl ether copolymers, perfluorocyclopolymer, vinyl ether-fluoroolefin copolymers, vinyl ester-fluoroolefin copolymers, tetrafluoroethylene-vinyl ether copolymers, chlorotrifluoroethylene-vinyl ether copolymers, urethane-crosslinked tetrafluoroethylene, epoxy-crosslinked tetrafluoroethylene, acryl-crosslinked tetrafluoroethylene, and melamine-crosslinked tetrafluoroethylene.

The binder component preferably includes titanium peroxide. The binder component (D) may include the titanium peroxide in a proportion of preferably 10 percent by weight or more, more preferably 20 percent by weight or more, furthermore preferably 30 percent by weight or more, particularly preferably 50 percent by weight or more, and most preferably 75 percent by weight or more, based on the total amount of the binder component (D). The titanium peroxide may be used alone or in combination with at least one of a silicon compound and a fluorocarbon resin. The titanium peroxide has high film-formability and, when applied and dried, can rapidly form a coating film having excellent adhesiveness. In addition, the titanium peroxide is not decomposed even by the photocatalysis of the titanium oxide particles, thereby has excellent durability, and can fix the titanium oxide particles onto the surface of the substrate (article to be coated) over a long time.

Titanium Oxide Dispersion Liquid

The titanium oxide dispersion liquid according to the present invention includes the titanium oxide particles (A) supporting a transition metal compound, the dispersing agent (B) including the poly(acrylic acid) or a salt thereof, and the solvent (C).

The dispersing agent (B) including the poly(acrylic acid) salt may be used in an amount (in terms of solids content) of typically 1 to 50 parts by weight, preferably 3 to 40 parts by weight, and more preferably 5 to 30 parts by weight, per 100 parts by weight of the titanium oxide particles (A) supporting a transition metal compound in the dispersion liquid. The dispersing agent (B) including a poly(acrylic acid) salt, if used in an excessively small amount, may readily offer lower titanium oxide dispersibility. In contrast, the dispersing agent (B), if used in an excessively large amount, may readily cause titanium oxide aggregation.

The titanium oxide dispersion liquid according to the present invention may further include one or more other dispersing agents in addition to the dispersing agent (B) including the poly(acrylic acid) or a salt thereof. In this case, the titanium oxide dispersion liquid may include the dispersing agent (B) including the poly(acrylic acid) or a salt thereof in a proportion of 25 percent by weight or more, preferably 50 percent by weight or more, and particularly preferably 75 percent by weight or more, of the total dispersing agents contained in the titanium oxide dispersion liquid according to the present invention.

The titanium oxide dispersion liquid may have a total solids content of typically 0.1 to 50 percent by weight, preferably 0.2 to 40 percent by weight, and more preferably 1 to 30 percent by weight, while the total solids content can be selected as appropriate. The titanium oxide dispersion liquid may contain the titanium oxide particles (A) supporting a transition metal compound in a content of typically 0.1 to 15 percent by weight, and preferably 1 to 10 percent by weight.

The titanium oxide dispersion liquid may be prepared typically, but not limitatively, by mixing the titanium oxide particles (A) supporting a transition metal compound, the dispersing agent (B), and the solvent (C) with one another. The titanium oxide dispersion liquid may be prepared by adding the components in any order not limited, but may be prepared by preparing a slurry solution including the titanium oxide particles (A) supporting a transition metal compound and the solvent (C), adding the dispersing agent (B) to the slurry solution, and mixing them using a disperser. The disperser is exemplified by bead mill, jet mill, roll mill, hammer mill, vibrating mill, ball mill, sand mill, pearl mill, spike mill, agitator mill, and CoBall-Mill, of which medium-agitating dispersers are preferred.

Titanium Oxide Coating Liquid

The titanium oxide coating liquid according to the present invention includes the titanium oxide dispersion liquid and at least one binder component (D) selected from the group consisting of titanium peroxide, silicon compounds, and fluorocarbon resins.

The titanium oxide coating liquid according to the present invention may have a compositional ratio (weight ratio) of the titanium oxide particles (A) supporting a transition metal compound to the binder component (D) of typically 1:6 to 30:1, preferably 1:1 to 15:1, and particularly preferably 1.5:1 to 13:1. The titanium oxide coating liquid, if including the titanium oxide particles (A) supporting a transition metal compound in a compositional ratio less than the range, may tend to cause the photocatalyst to have a lower photocatalytic activity. In contrast, the titanium oxide coating liquid, if including the titanium oxide particles (A) supporting a transition metal compound in a compositional ratio greater than the range, may tend to have lower adhesiveness to the substrate (article to be coated) and to less prevent the deterioration of the substrate (article to be coated).

The titanium oxide coating liquid may have a total solids content of typically 0.1 to 50 percent by weight, preferably 0.2 to 40 percent by weight, and more preferably 1 to 30 percent by weight, while the total solids content may be selected as appropriate within such a range as not to adversely affect properties such as coating workability. The titanium oxide coating liquid may contain the titanium oxide particles (A) supporting a transition metal compound in a content of typically 0.1 to 15 percent by weight, and preferably 1 to 10 percent by weight.

The titanium oxide coating liquid may be prepared typically, but not limitatively, by adding the binder component (D) to the titanium oxide dispersion liquid and mixing them using a disperser. The disperser is exemplified by bead mill, jet mill, roll mill, hammer mill, vibrating mill, ball mill, sand mill, pearl mill, spike mill, agitator mill, and CoBall-Mill, of which medium-agitating dispersers are preferred.

In addition to the titanium oxide dispersion liquid and the binder component (D), the titanium oxide coating liquid according to the present invention may further include one or more other components as needed and as appropriate. Such other components are exemplified by coating auxiliaries and other components generally incorporated into photocatalytic coating materials. The titanium oxide coating liquid may contain the other component(s) in an amount within such a range as not to adversely affect advantageous effects of the present invention, for example, in an amount of about 10 percent by weight or less, and typically 0.01 to 10 percent by weight, based on the total amount of the titanium oxide coating liquid.

Photocatalyst Coating Film and Photocatalyst-Coated Article

The photocatalyst coating film according to the present invention is formed using the titanium oxide coating liquid.

The photocatalyst-coated article according to the present invention includes a substrate (article to be coated) and the photocatalyst coating film disposed on or over a surface of the substrate. The photocatalyst coating film and photocatalyst-coated article according to the present invention can be produced typically by applying the titanium oxide coating liquid to a surface of the substrate, and drying the applied coating liquid. The "surface" is at least one surface of the substrate when the substrate is in sheet form.

The substrate constituting the photocatalyst-coated article according to the present invention may be made of any material not limited. The material is exemplified by a variety of plastic materials including olefinic resins including an α-olefin as a monomer component, such as polyethylenes (PEs), polypropylenes (PPs), ethylene-propylene copolymers, and ethylene-vinyl acetate copolymers (EVAs); polyesters such as poly(ethylene terephthalate)s (PETs), poly(ethylene naphthalate)s (PENs), and poly(butylene terephthalate)s (PBTs); poly(vinyl chloride)s (PVCs); vinyl acetate resins; poly(phenylene sulfide)s (PPSs); polyamide resins such as polyamides (nylons) and wholly aromatic polyamides (aramids); polyimides; and poly(ether ether ketone)s (PEEKs). The material is further exemplified by rubber materials such as natural rubbers, synthetic rubbers, and silicon rubbers; metal materials such as aluminum, copper, iron, and stainless steels; papery materials such as paper and paper-like substances; ligneous materials such as wood, MDF and other wooden boards, and plywood; fibrous materials such as nonwoven fabrics and woven fabrics; leather materials; inorganic materials such as stones and concrete; glass materials; porcelain materials; and other materials. Among them, the substrate is preferably selected from plastic substrates such as plastic sheets.

The substrate for use herein is not limited in its intended use and is exemplified by articles where any of antibacterial/antifungal action, deodorization, air purification, water purification, and antifouling action is expected; and films, sheets, and labels or seals to be affixed to the article surfaces. The articles just mentioned above are exemplified by lenses such as spectacle lenses and camera lenses; prisms; members for automobiles, railway vehicles, and other vehicles, such as windowpanes, lighting covers, and rear-view mirrors; building components such as external wall materials, internal wall materials, sashes, and windowpanes; machinery constructional elements; display devices such as traffic control signs; advertising towers; sound barriers such as those for roads and those for railroads; bridges; guard rails; tunnels; insulators; solar cell covers; solar water heater collector covers; lighting apparatuses; bathroom products; bathroom members such as mirrors and bathtubs; kitchenware; kitchen members such as kitchen panels, sinks, range hoods, and ventilating fans; air-conditioning systems; bathroom (toilet) furnishings; and toilet members such as toilet bowls.

The titanium oxide coating liquid can be applied to the substrate typically with a spray, brush, or roller, or by gravure printing. The titanium oxide coating liquid after applied to the substrate surface is dried (to evaporate the solvent) and can thereby rapidly form a coating film. The drying may be performed at room temperature or with heating.

Titanium oxide coating liquid may be applied in a mass of coating within such a range that the content of the titanium oxide particles (A) supporting a transition metal compound is typically 0.1 g/m$^2$ or more, preferably 0.1 to 5.0 g/m$^2$, and particularly preferably 0.1 to 3.0 g/m$^2$. The titanium oxide coating liquid, if applied in a mass of coating less than the range, may readily cause the resulting photocatalyst to have a lower photocatalytic activity.

The titanium oxide coating liquid may be applied to the substrate surface directly, or indirectly through an under coat. In the latter case, a coating agent containing a binder component is applied to the substrate surface to form the under coat, and the titanium oxide coating liquid is applied onto the under coat. The binder component is preferably titanium peroxide. The under coat, when disposed, completely separates the substrate and the photocatalytic coating film from each other. The under coat thereby completely blocks and protects the substrate from the photocatalysis and from damage even when the substrate used in the article is made of an organic material. The under coat, when disposed on the substrate surface, may have a thickness of typically 0.01 to 5.0 μm, and preferably 0.1 to 2.0 μm.

The photocatalyst coating film and photocatalyst-coated article formed in the above manner can exhibit a high photocatalytic activity and, upon light irradiation, can decompose a harmful chemical substance even to water and carbon dioxide levels. The photocatalyst coating film and photocatalyst-coated article are usable in a variety of applications such as antibacterial/antifungal applications, deodorization, air purification, water purification, and antifouling applications.

Conventional titanium oxide photocatalysts require ultraviolet rays, thereby fail to exhibit sufficient functions in a room receiving only small amounts of ultraviolet rays, and make little progress toward indoor applications. By contrast, the photocatalyst coating film and photocatalyst-coated article according to the present invention employ the titanium oxide particles supporting a transition metal compound as a photocatalyst. They thereby have responsibility to light in a wide wavelength range from the ultraviolet ray region to the visible light region, can absorb even light in a regular living space, typically from sunlight, an incandescent lamp, or a fluorescent lamp, and can exhibit a high catalytic activity. Accordingly, they exhibit gas decomposition capability and antimicrobial action at high levels even in a low-light-intensity environment such as in a room and can be applied to wide-range uses. The uses are exemplified by environmental purification in indoor wallpaper, furniture, and other domestic articles, as well as in public facilities such as hospitals and schools; and contribution to enhanced functionality of household electrical appliances.

EXAMPLES

The present invention will be illustrated in further detail with reference to several examples below. It should be noted, however, that the examples are by no means intended to limit the scope of the present invention.

Preparation Example 1

Preparation of Crude Aqueous Titanium Oxide Dispersion

An aqueous titanium tetrachloride solution was prepared as a product supplied by Toho Titanium Co., Ltd. and having a titanium concentration of 16.5 percent by weight ±0.5 percent by weight and a chlorine ion concentration of 31 percent by weight ±2 percent by weight. The aqueous titanium tetrachloride solution was diluted with pure water at room temperature (25° C.) so as to have a titanium concentration of 5.6 percent by weight. A 10-L autoclave lined with tantalum was charged with 5650 g of the diluted aqueous titanium tetrachloride solution and hermetically sealed. The autoclave internal temperature was raised up to 140° C. over 2 hours using a heat medium. The autoclave was then held at a temperature of 140° C. and a pressure equal to the vapor pressure at that temperature for 10 hours with stirring and was then cooled by cooling the heat medium. After verifying that the autoclave internal temperature reached 40° C. or lower, 5650 g of a crude aqueous titanium oxide dispersion were retrieved.

Cross-Flow Membrane Filtration Treatment (1)

The obtained crude aqueous titanium oxide dispersion was subjected to a cross-flow filtration treatment using a hollow-fiber ultrafiltration membrane at room temperature (25° C.) and at a filtration pressure of 0.02 MPa while adding pure water in the same amount as the amount of the filtrate and thereby yielded an aqueous titanium oxide dispersion. The hollow-fiber ultrafiltration membrane was a product available under the trade name of FS03-FC-FUS03C1 from DAICEN MEMBRANE-SYSTEMS Ltd., made of a PES, and having a nominal molecular weight cut off of $3\times10^4$. Part of the aqueous titanium oxide dispersion was dried at 105° C. under normal atmospheric pressure for one hour to yield a mixture of rod-like rutile titanium dioxide having (110) and (111) planes and rod-like rutile titanium dioxide having (110), (111), and (001) planes.

Iron Compound Supporting Treatment

The above-prepared aqueous titanium oxide dispersion was combined with 7.5 g of an aqueous iron chloride solution (35 percent by weight), followed by stirring at room temperature (25° C.) for 30 minutes. The mixture was further combined with 95 g (1.7 percent by weight relative to the aqueous titanium oxide dispersion) of methanol, irradiated with an ultraviolet ray (UV) for 3 hours at an UV irradiance of 5 mW/cm$^2$ using a 100-W high-pressure mercury lamp and yielded a crude aqueous dispersion of iron-compound-supporting titanium oxide.

Cross-Flow Membrane Filtration Treatment (2)

The crude aqueous dispersion of iron-compound-supporting titanium oxide was subjected to a cross-flow filtration treatment using a hollow-fiber ultrafiltration membrane at room temperature (25° C.) and at a filtration pressure of 0.02 MPa while adding pure water in the same amount as the amount of the filtrate and thereby yielded a purified aqueous dispersion of iron-compound-supporting titanium oxide. The hollow-fiber ultrafiltration membrane was a product available under the trade name of FS03-FC-FUS03C1 from DAICEN MEMBRANE-SYSTEMS Ltd., made of a PES, and having a nominal molecular weight cut off of $3\times10^4$.

Part of the obtained purified aqueous dispersion of iron-compound-supporting titanium oxide was dried at 105° C. under normal atmospheric pressure for one hour and yielded an iron-compound-supporting titanium oxide having a specific surface area and 78 m$^2$/g and an average aspect ratio of 3. The iron-compound-supporting titanium oxide contained (supported) the iron compound in a content of 830 ppm. The obtained iron-compound-supporting titanium oxide was found to be a mixture including rod-like rutile titanium dioxide having (110) and (111) planes and supporting the iron compound on the (111) plane, and rod-like rutile titanium dioxide having (110), (111), and (001) planes and supporting the iron compound on the (001) and (111) planes.

Example 1

Preparation of Titanium Oxide Dispersion Liquid

An aliquot (200 g) of the purified aqueous dispersion of iron-compound-supporting titanium oxide (having an iron-compound-supporting titanium oxide concentration of 10 percent by weight) obtained in Preparation Example 1 was combined with 10 g of an aqueous sodium polyacrylate solution and 190 g of ion-exchanged water, dispersed using a wet medium-agitating mill (trade name ULTRA APEX MILL UAM-015, supplied by KOTOBUKI INDUSTRIES CO., LTD.), and yielded a titanium oxide sol (titanium oxide dispersion liquid) having an iron-compound-supporting titanium oxide concentration of 5 percent by weight. The aqueous sodium polyacrylate solution was a product available under the trade name of Aron T-50 from Toagosei Co., Ltd., having a solids content of 43 percent by weight and a sodium polyacrylate weight-average molecular weight of 6000.

Preparation of Titanium Oxide Coating Liquid

The titanium oxide sol was further combined and mixed with 170 g of an aqueous solution of titanium peroxide as a binder and yielded a titanium oxide coating liquid (1) (photocatalytic coating liquid). This had a ratio (weight ratio) of the iron-compound-supporting titanium oxide to the titanium peroxide of 12:1. The aqueous solution of titanium peroxide was a product available under the trade name of TiOSKYCOAT C from TiO TECHNO Co., Ltd. and having a titanium peroxide concentration of 1 percent by weight.

Preparation of Photocatalyst Coating Film

The obtained titanium oxide coating liquid (1) was applied onto a glass plate to a mass of coating (dry weight) of 1.5 g/m$^2$ by spray coating and yielded a photocatalyst coating film (1) having a thickness of 1 μm. The resulting photocatalyst coating film (1) was subjected to evaluation tests as follows.

(1) VOC Decomposition Test

The photocatalyst coating film (1) was irradiated with light to decompose methyl mercaptan as a VOC in a gas phase, and the photocatalytic performance was evaluated based on the decomposition rate of methyl mercaptan.

Specifically, the photocatalyst coating film (1) of a size of 5 cm by 10 cm was placed in a reactor (Tedlar bag, made of a poly(vinyl fluoride)). One liter of a 70-ppm methyl mercaptan gas was blown into the reactor, and light irradiation was performed at room temperature (25° C.) using a fluorescent lamp at 1000 lux. Twenty-four (24) hours into the light irradiation, the amount of residual methyl mercaptan in the reactor was measured using a gas chromatograph (trade name GC-2010, supplied by Shimadzu Corporation) equipped with a flame photometric detector. The difference in methyl mercaptan concentration between the initial concentration and the concentration after the light irradiation was determined, based on which the decomposition rate (%) was calculated. As a result, it was found that 100% of methyl mercaptan was decomposed after 24 hours.

(2) Coating Film Surface Hardness

The photocatalyst coating film (1) was examined to evaluate a surface hardness using a pencil hardness tester (supplied by Nihon Rigaku Kogyo K.K.) according to criteria in compliance with JIS 5600-5-4. As a result, the photocatalyst coating film (1) was found to have a pencil hardness of HB.

(3) Coating Film Adhesion

The photocatalyst coating film (1) was examined to evaluate adhesion to a glass plate by a cross-cut testing method according to criteria in compliance with JIS 5600-5-6. As a result, the photocatalyst coating film (1) was found to offer little separation (corresponding to Grade 0 in JIS 5600-5-6).

(4) Coating Film Transparency

The photocatalyst coating film (1) was examined to evaluate its transparency based on cloudiness (haze) and total luminous transmittance as measured using a haze meter (trade name NDH5000W, supplied by Nippon Denshoku Industries Co., Ltd.). As a result, the photocatalyst coating film (1) was found to have a haze of 43% and a total luminous transmittance of 84%.

Example 2

Preparation of Titanium Oxide Coating Liquid

An aliquot (500 g) of the purified aqueous dispersion of iron-compound-supporting titanium oxide (having an iron-compound-supporting titanium oxide concentration of 10 percent by weight) obtained in Preparation Example 1 was combined with 5.87 g of an aqueous sodium polyacrylate solution (trade name NOPCOSPERSE 44C, having a solids content of 40 percent by weight, supplied by SAN NOPCO LIMITED) and dispersed using a wet medium-agitating mill (trade name ULTRA APEX MILL UAM-015, supplied by KOTOBUKI INDUSTRIES CO., LTD.) at room temperature (25° C.) and yielded a titanium oxide sol having an iron-compound-supporting titanium oxide concentration of 9.9 percent by weight. The titanium oxide sol was further combined and mixed with 14.4 g of ion-exchanged water and 8.5 g of an aqueous solution of titanium peroxide as a binder and yielded a titanium oxide coating liquid (2) (photocatalytic coating liquid). This had a ratio (weight ratio) of the iron-compound-supporting titanium oxide to the titanium peroxide of 8:1. The aqueous solution of titanium peroxide was a product available under trade name of TiOSKYCOAT C from TiO TECHNO Co., Ltd. and having a titanium peroxide concentration of 1 percent by weight.

Preparation of Photocatalyst Coating Film

The obtained titanium oxide coating liquid (2) was applied onto a glass plate to a mass of coating (dry weight) of 1.5 g/m² by spray coating and yielded a photocatalyst coating film (2) having a thickness of 1 μm. The obtained photocatalyst coating film (2) was subjected to evaluation tests as follows.

(1) VOC Decomposition Test

The photocatalyst coating film (2) was irradiated with light to decompose acetaldehyde as a VOC in a gas phase, and a decomposition rate of acetaldehyde was determined to evaluate photocatalytic performance.

Specifically, the photocatalyst coating film (2) of a size of 5 cm by 10 cm was placed in a reactor (Smart Bag, made of a poly(vinylidene fluoride)). One liter of 16-ppm acetaldehyde gas was blown into the reactor, and light irradiation was performed at room temperature (25° C.) using a fluorescent lamp at 6000 lux. Twenty-four (24) hours into the light irradiation, the amount of residual acetaldehyde in the reactor was measured using a gas chromatograph (trade name GC-14B, supplied by Shimadzu Corporation) equipped with a flame ionization detector. The difference in acetaldehyde concentration between the initial concentration and the concentration after the light irradiation was determined, based on which the decomposition rate (%) was calculated. As a result, it was found that 100% of acetaldehyde was decomposed after 24 hours.

Comparative Example 1

An aliquot (200 g) of the purified aqueous dispersion of iron-compound-supporting titanium oxide (having an iron-compound-supporting titanium oxide concentration of 10 percent by weight) obtained in Preparation Example 1 was combined with and dispersed in 200 g of ion-exchanged water using a wet medium-agitating mill (trade name ULTRA APEX MILL UAM-015, supplied by KOTOBUKI INDUSTRIES CO., LTD.) and yielded a titanium oxide sol having an iron-compound-supporting titanium oxide concentration of 5 percent by weight. The titanium oxide sol was further combined and mixed with 170 g of an aqueous solution of titanium peroxide (trade name TiOSKYCOAT C, supplied by TiO TECHNO Co., Ltd., having a titanium peroxide concentration of 1 percent by weight) as a binder and yielded a titanium oxide coating liquid (3) (photocatalytic coating liquid). This had a ratio (weight ratio) of the iron-compound-supporting titanium oxide to the titanium peroxide of 12:1. After a while, however, the coating liquid appeared to include aggregates among the iron-compound-supporting titanium oxide particles and had lower transparency.

INDUSTRIAL APPLICABILITY

The titanium oxide dispersion liquid according to the present invention can be prepared simply at a temperature adjacent to room temperature in a nearly neutral region without being dissolved in a large amount of an aqueous hydrogen peroxide solution at a high temperature, has excellent dispersion stability, and can maintain a high dispersion state over a long time. The titanium oxide dispersion liquid can give a titanium oxide photocatalyst capable of developing inherent photocatalytic performance within a shorter waiting time after it decomposes the dispersing agent, and can ensure immediate effectivity of the photocatalytic performance. The titanium oxide coating liquid according to the present invention containing the titanium oxide dispersion liquid can be prepared in a nearly neutral region and is highly versatile. In addition, the titanium oxide coating liquid has dispersibility and dispersion stability both at superior levels and offers excellent coatability.

The invention claimed is:

1. A titanium oxide dispersion liquid comprising:
    titanium oxide particles (A) supporting an iron compound,
    wherein the titanium oxide particles are selected from the group consisting of: rutile titanium dioxide having (110) and (111) planes, supporting the iron compound on the (111) plane; rutile titanium dioxide having (110), (111), and (001) planes, supporting the iron compound on the (111) and (001) planes; and mixtures thereof, and
    wherein the supported amount of the iron compound is 50 ppm or more on a weight basis relative to the titanium oxide particles;
    a dispersing agent (B) comprising a poly(acrylic acid) or a salt of the poly(acrylic acid); and
    a solvent (C).

2. The titanium oxide dispersion liquid according to claim 1, wherein the dispersing agent (B) comprises a poly(acrylic acid) alkali metal salt as the poly(acrylic acid) or a salt thereof.

3. The titanium oxide dispersion liquid according to one of claims 1 and 2, wherein the poly(acrylic acid) or a salt thereof in the dispersing agent (B) has a weight-average molecular weight of from 1000 to 100000.

4. The titanium oxide dispersion liquid according to claim 1, wherein the titanium oxide particles (A) supporting an iron compound comprise titanium oxide particles supporting iron compound on a plane acting as an oxidation site.

5. A titanium oxide coating liquid comprising:
the titanium oxide dispersion liquid according to claim 1; and
at least one binder component (D) selected from the group consisting of: titanium peroxide; silicon compounds; and fluorocarbon resins.

6. The titanium oxide coating liquid according to claim 5, wherein the binder component (D) comprises titanium peroxide.

7. A photocatalyst coating film formed using the titanium oxide coating liquid according to one of claims 5 and 6.

8. A photocatalyst-coated article comprising:
a substrate; and
the photocatalyst coating film according to claim 7 disposed on or over a surface of the substrate.

* * * * *